(12) United States Patent
Tsuji

(10) Patent No.: US 7,176,829 B2
(45) Date of Patent: Feb. 13, 2007

(54) MICROWAVE SENSOR

(75) Inventor: Masatoshi Tsuji, Otsu (JP)

(73) Assignee: Optex Co., Ltd., Shiga (JP)

( * ) Notice: Subject to any disclaimer, the term of this patent is extended or adjusted under 35 U.S.C. 154(b) by 111 days.

(21) Appl. No.: 11/045,316

(22) Filed: Jan. 31, 2005

(65) Prior Publication Data
US 2005/0174278 A1 Aug. 11, 2005

(30) Foreign Application Priority Data
Feb. 4, 2004 (JP) ............................ 2004-028103

(51) Int. Cl.
G01S 13/56 (2006.01)
G01S 7/35 (2006.01)
G08B 12/24 (2006.01)

(52) U.S. Cl. ....................................................... 342/28

(58) Field of Classification Search .................... 342/28
See application file for complete search history.

(56) References Cited

U.S. PATENT DOCUMENTS 5,559,517 A * 9/1996 Didomizio .................. 342/156

2005/0174278 A1 * 8/2005 Tsuji ............................ 342/28

FOREIGN PATENT DOCUMENTS

| GB | 2410851 A | * | 8/2005 |
| JP | 2003-121532 | | 4/2003 |
| JP | 2003-207462 | | 7/2003 |

* cited by examiner

*Primary Examiner*—Dan Pihulic
(74) *Attorney, Agent, or Firm*—Wenderoth, Lind, & Ponack, L.L.P.

(57) ABSTRACT

In one embodiment of a microwave sensor, when a "low" plants countermeasure is conducted, if an alert has been generated 5 times or more within 1 minute, an object decision move distance is changed to be longer and a "high" plants countermeasure is conducted. Subsequently, when assuming that the plants countermeasure is "low", only if the alert is not generated within 10 minutes, the plants countermeasure is returned to "low". Further, if the alert is not generated within 10 minutes in the status of the "low" plants countermeasure, the plants countermeasure is canceled.

4 Claims, 3 Drawing Sheets

IFout1

IFout2

W1

W2

Δt

MICROWAVE SENSOR

CROSS-REFERENCE TO RELATED APPLICATION

This application claims priority under 35 U.S.C. §119 (a) to Patent Application No. 2004-028103 filed in Japan on Feb. 4, 2004, the content of which is hereby incorporated herein by reference in its entirety.

BACKGROUND OF THE INVENTION

1. Field of the Invention

The present invention relates to a microwave sensor. More particularly, the present invention relates to a solution for improving accuracy of detection of an object to be detected by the microwave sensor.

2. Description of the Related Art

Conventionally, as a security apparatus, a microwave sensor is known for sending microwaves to a detection area and, if a human body (an intruder) exists in the detection area, the microwave sensor receives waves reflected from the human body (microwaves modulated by the Doppler effect) to detect the human body see, e.g., Japanese Patent Application Laid-Open Publication No. 2003-121532).

Also, one type of microwave sensor is known for measuring a distance to an object utilizing a plurality of microwaves with different frequencies. This kind of sensor sends, for example, two microwaves with different frequencies to the detection area two microwaves with different frequencies to the detection area and detects a phase difference between two intermediate frequency (IF) signals based on respective reflected waves. The phase difference correlates with a distance to a detection target object, such as a human body, and tends to be increased as the distance to the detection target object becomes. Therefore, by finding the phase difference, the distance to the detection target object can be measured. Further, recognizing temporal change in the phase difference enables the determination of whether or not an object in the detection area is moving. In this way, for example, only an object moving in the detection area can be selected as the detection target object. Hereinafter, the detection operation for the phase difference between IF signals will be described for this kind of sensor.

If output signals based on reflected waves of two microwaves with different frequencies are sinusoidal waves IFout1 and IFout2 shown in FIG. 3(a) and FIG. 3(b) (which have a phase difference corresponding to a distance to a detection target object), rectangular waves W1 and W2 are formed from these IF output signals as shown in FIG. 4(a) and FIG. 4(b), respectively. By detecting a phase difference between the rectangular waves W1 and W2 (converted from a time difference Δt between rising edge portions of the rectangular waves in the figures), the distance to the detection target object can be measured. Further, recognizing a temporal change in the phase difference between the rectangular waves W1 and W2 enables the recognition of the movement of the object in the detection area.

If this kind of sensor is used as a security sensor and if an object moving in the detection area is only decided as the detection target object by recognizing the temporal change in the phase difference, the following problems are posed.

If this kind of sensor is installed outdoors, the phase difference between the rectangular waves W1 and W2 is generated by the swinging of plants or the like due to the wind and, thus, the plants or the like may be falsely detected (falsely alerted) as the detection target object. These situations are caused not only by the swinging of plants but also by rainfall or vibration of the sensor itself (vibration due to the wind). Similarly, if this kind of sensor is installed indoors, the phase difference between the rectangular waves W1 and W2 is generated by a rotating motion of an exhaust fan or the swinging of a blind or curtain and, also in this case, an object other than a human body may be falsely detected as the detection target object.

In consideration of these problems, the inventor of the present invention has already proposed a microwave sensor which can accurately distinguish the detection target object such as a human body from another non-detection target object for avoiding a false alert (see, e.g., Japanese Patent Application Laid-Open Publication No. 2003-207462). Specifically, a total move distance is recognized for the object in the detection area and, if the total move distance exceeds a predetermined distance, the object will be selected as the detection target object (since, in the case of plants, the total move distance does not exceed the predetermined distance). Hereinafter, such a countermeasure is referred to as "a plants countermeasure".

As stated above, although it is effective to distinguish the detection target object from plants or the like by recognizing the total move distance of the object in detection area (the plants countermeasure), it is difficult to appropriately set a level for distinguishing the detection target object from plants (a plants countermeasure level: a distance as a decision value for distinguishing the detection target object from plants or the like).

In other words, if the plants countermeasure level has been set low (an object is detected even if the total move distance of the object is short), in the situation that plants are swinging in the range of a few dozen centimeters (cm), the plants may be recognized as the detection target object and a false alert may be generated. Especially, although this kind of microwave sensor is often used in combination with a passive infra-red (PIR) sensor which receives infrared radiation from a human body in the detection area and which detects an intruder from difference between the human body and an ambient temperature (as a combination sensor), if the plants countermeasure level is set low in this way, the microwave sensor may continuously generate false alerts. As a result, substantially no difference is made in comparison to the case that a sensor apparatus consists of the PIR sensor only, and credibility of the combination sensor may be reduced.

Contrary, if the plants countermeasure level has been set high (an object is not detected unless the total move distance of the object becomes long (e.g., on the order of 100 cm), it is difficult to detect a moving human body passing transversely across the detection area (a moving object with less change in a relative distance to the microwave sensor) and, also in this case, credibility of the microwave sensor can not be ensured.

BRIEF SUMMARY OF THE INVENTION

The present invention was conceived in terms of such considerations and the object thereof is to provide a microwave sensor that can stably maintain a credible object detection operation regardless of changes in environment as a microwave sensor implementing the plants countermeasure.

The present invention provides a microwave sensor transmitting microwaves toward a detection area and, if an object exists in the detection area, detecting the object by receiving the reflected microwaves, which are reflected by the object and modulated by the Doppler effect, the microwave sensor comprising object decision means operable to receive the reflected waves to measure a move distance of the object existing in the detection area, the object decision means deciding that the object is a detection target object only if the measured move distance is greater than a preset object decision move distance, wherein the object decision means change the object decision move distance to be longer when the number of times that the object is determined to be the detection target object within a first predetermined period of time preset in advance is equal to or greater than a first predetermined number of times and, on the other hand, subsequently change the object decision move distance to be shorter when the number of times that the object is decided to be the detection target object within a second predetermined period of time preset in advance is less than a second predetermined number of times.

Regarding the microwave sensor, although a two-frequency type microwave sensors are referred to herein, which, for example, sends two different microwaves and, if an object exists in the sending direction of the microwave, receives reflected waves of each microwave from the object to measure a distance to the object with a phase difference between intermediate frequency (IF) signals after mixing these reflected waves with the transmitted waves, the microwave sensor is not limited to this.

According to such embodiment(s) of the microwave sensor of the present invention, in the situation that a false alert is frequently generated by, for example, swinging of plants due to effects of winds or vibration of the microwave sensor itself, the setting of the object decision move distance is changed to be longer. In this way, unless the swinging of the plants due to effects of winds or vibration of the microwave sensor itself, becomes equal to or greater than the extended object decision move distance, the false alert is almost never generated and false-alert generating factors can be reduced. On the other hand, after the setting of the object decision move distance is changed to be longer in this way, if the number of times that the object is decided to be the detection target object is low (less than a second predetermined number of times) within a predetermined period of time (a second predetermined period of time), the setting of the object decision move distance is changed to be shorter in order to avoid a missed alert. With this operation, the appropriate object decision move distance is automatically set for current environmental conditions (wind conditions and the like); the detection target object such as a human body can be certainly distinguished from non-detection target objects such as plants or the like; the false alert and the missed alert can be avoided as much as possible; and a microwave sensor with high object detection accuracy can be obtained.

In the microwave sensor of the present invention, the object decision move distance may be changeable to a plurality of levels, and the object decision means may change the object decision move distance by one level both when the object decision move distance is changed to be longer and when the object decision move distance is changed to be shorter. According to such a configuration, good convergence to the appropriate object decision move distance is achieved depending on environment, without drastically changing the object decision move distance.

In the microwave sensor of the present invention, the object decision move distance may be changeable to a plurality of levels, and after the object decision move distance is changed to be longer, when assuming that the object decision move distance is an object decision move distance before changing, if the number of times that the object is decided to be the detection target object within the second predetermined period of time is less than the second predetermined number of times, the object decision means may change the object decision move distance to be shorter, whereas, when assuming as above, if the number of times that the object is decided to be the detection target object within the second predetermined period of time is equal to or greater than the second predetermined number of times, the object decision means may maintain the currently set object decision move distance. According to such a configuration, the setting of the object decision move distance can be prevented from being frequently changed and stability of the control can be maintained.

DETAILED DESCRIPTION OF THE INVENTION

Embodiments of the present invention will now be described with reference to the drawings. This description will be made for the case that a microwave sensor is used for a security sensor and that the present invention is applied to a microwave sensor which decides a detection target object (such as an intruder) by utilizing two microwaves with different frequencies.

Description of Configuration of Microwave Sensor

Figure 1:
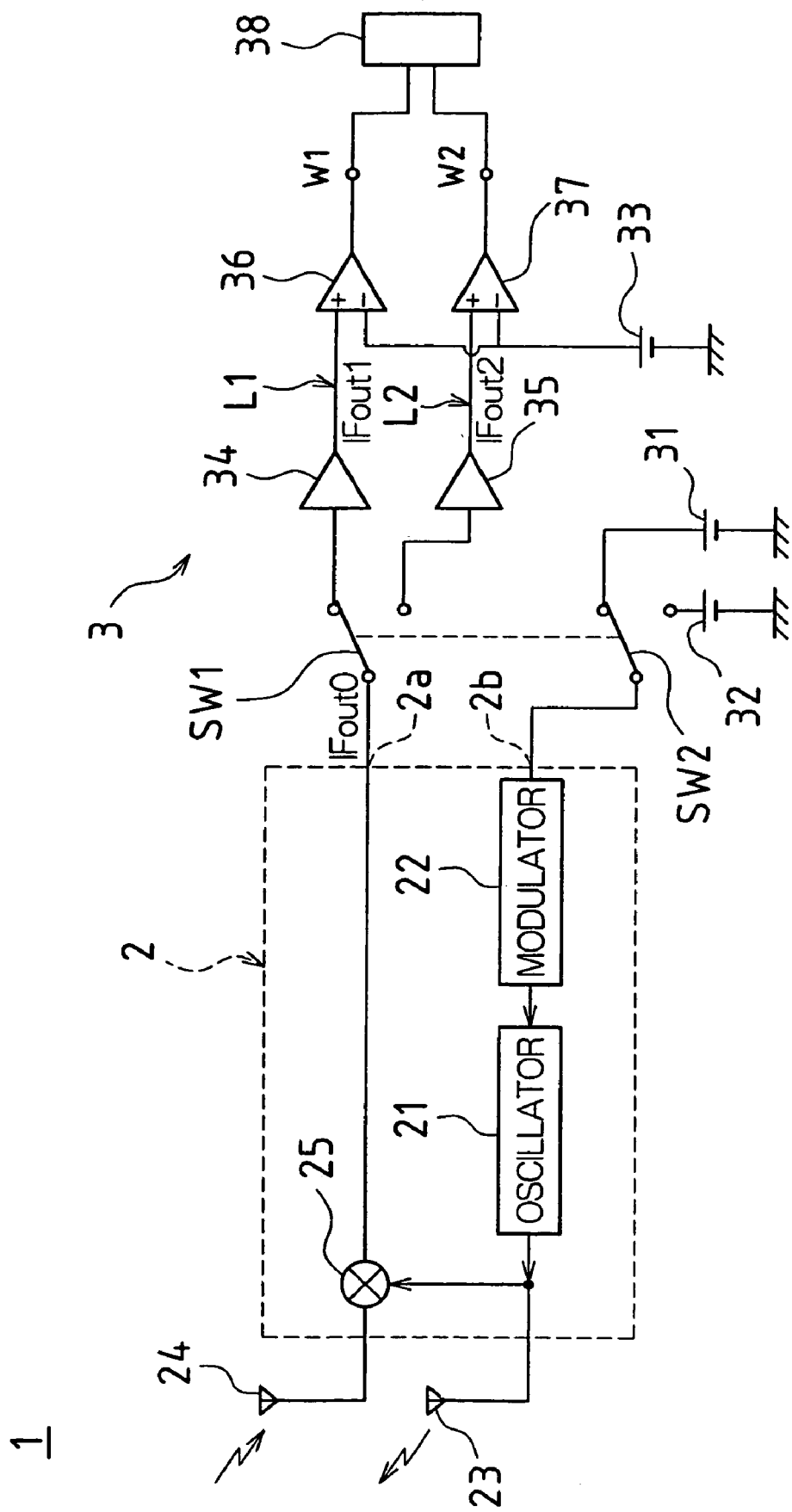
FIG. 1 is a schematic diagram of a circuit configuration of a microwave sensor associated with one embodiment of the present invention.

FIG. 1 is a schematic diagram of a circuit configuration of a microwave sensor 1 associated with one embodiment of the present invention. As shown in FIG. 1, the microwave sensor 1 is comprised of a radio frequency (RF) module 2 and a signal processing unit 3.

The RF module 2 is comprised of an oscillator 21 for oscillating a microwave, a modulator 22 for switching a frequency of the microwave oscillated by the oscillator 21, a transmitting antenna 23 for transmitting the microwave oscillated by the oscillator 21 toward a detection area, a receiving antenna 24 for receiving a reflected wave of the microwave reflected by an object such as a human body, and a mixer 25 for mixing and outputting the received microwaves and a voltage waveform of the oscillator 21. The microwave is transmitted toward the detection area from the transmitting antenna 23 and, if a human body or the like exists in the detection area, the microwave is received by the receiving antenna 24 after a frequency of the reflected wave from the human body or the like is modulated by the Doppler effect. The received reflected wave is mixed with the voltage waveform of the oscillator 21 by the mixer 25 and is subsequently output as an intermediate frequency (IF) output signal (IFout0) from an output side 2a of the RF module 2 to the signal processing unit 3.

On the other hand, the signal processing unit 3 is comprised of a first output line L1 having an IF amplifier 34 and a comparator 36, a second output line L2 having an IF amplifier 35 and a comparator 37, and a power source 33 which is a reference voltage of the comparators 36 and 37, corresponding to each microwave with each frequency transmitted from the transmitting antenna 23. Further, power sources 31 and 32 are provided for the RF module 2 to oscillate two different microwaves and, on the output side of the comparators 36 and 37, an object decision unit 38 is provided as a characteristic of the present invention.

The IF amplifiers 34 and 35 are connected to the output side 2a of the RF module 2 via a first switch SW1. If one of the two different microwaves is transmitted from the transmitting antenna 23, the first switch SW1 is connected to the first output line L1 and, the other microwave is transmitted from the transmitting antenna 23, the first switch SW1 is switched to be connected to the second output line L2. Therefore, it is configured such that the IF output signal is output to the first output line L1 for a reflected wave reflected by a human body or the like when one microwave is transmitted and the it output signal is output to the second output line L2 for a reflected wave reflected by a human body or the like when the other microwave is transmitted.

The power sources 31 and 32 are connected to the input side 2b of the Pt module 2 via a second switch SW2 working with the first switch SW1. For the second switch SW2, connection status to the power sources 31 and 32 is also switched depending on which of two different microwaves is transmitted from the transmitting antenna 23. Therefore, it is configured such that, depending on whether this second switch SW2 is connected to one power source 31 or the other power source 32, the modulator 22 switches frequencies of microwaves and, thus, a frequency of the microwave transmitted from the transmitting antenna 23 is switched.

In this way, corresponding to a switching operation of the first switch SW1 and the second switch SW2, two processing operations (a first processing operation and a second processing operation) are switched with predetermined time interval (e.g., an interval of several milliseconds). In the first processing operation, a microwave with one frequency is transmitted from the transmitting antenna 23 toward the detection area; the IF signal based on the reflected wave thereof is output to the first output line L1 of the signal processing unit 3; and a signal processing is performed in the first output line L1. In the second processing operation, a microwave with the other frequency is transmitted from the transmitting antenna 23 toward the detection area; the IF signal based on the reflected wave thereof is output to the second output line L2 of the signal processing unit 3; and a signal processing is performed in the second output line L2. Also, in the first processing operation, the IF output signal output from the RF module 2 is amplified by the IF amplifier 34, and the IF output signal (IFout1) from the IF amplifier 34 is formed as the rectangular wave W1 by the comparator 36 and then output to the object decision unit 38. Similarly, in the second processing operation, the IF output signal output from the RF module 2 is amplified by the IF amplifier 35, and the IF output signal (IFout2) from the IF amplifier 35 is formed as the rectangular wave W2 by the comparator 37 and then output to the object decision unit 38.

Further describing the each processing operation in detail, if no object such as a human body exists in the detection area, a frequency of the microwave transmitted from the transmitting antenna 23 is equal to a frequency of the microwave received by the receiving antenna 24 and, therefore, an IF frequency becomes "0" for the output signals from the IF amplifiers 34 and 35, and no signal is output from the comparators 36 and 37. Contrary to this, if a human body or the like exists in the detection area, the microwave received by the receiving antenna 24 is modulated and different from the frequency of the microwave transmitted from the transmitting antenna 23 and, therefore, changes in output signal waveforms are generated in the comparators 36 and 37, and these rectangular waves are output to the object decision unit 38.

Description of the Object Decision Unit 38

Description will be made for the object decision unit 38 receiving the output signal waveforms from the comparators 36 and 37. The object decision unit 38 receives the output signal waveforms from the respective comparators 36 and 37 and detects a move distance of an object existing in the detection area relative to the microwave sensor 1. Also, the object decision unit 38 decides whether the object in the detection area is the detection target object such as a human body or not based on the relative move distance of the detected object and, only if the object is the detection target object, transmits an object detection signal.

Specifically, a relative distance from the sensor 1 to the object is calculated and, only if the relative distance is greater than a preset value (in the present invention, referred to as an object decision move distance), the object detection signal is transmitted (generated as an alert) from the object decision unit 38.

Figure 3:
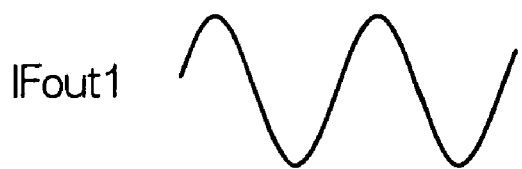
FIG. 3(a) is a waveform diagram of one of intermediate frequency (IF) output signals (IFout1) in a conventional two-frequency type microwave sensor.
FIG. 3(b) is a waveform diagram of the other IF output signal (IFout2) in a conventional two-frequency type microwave sensor.
Figure 3:
Figure 4:
FIG. 4(a) is a waveform diagram of a rectangular wave W1 formed from the IF output signal (IFout1) of FIG. 3(a).
FIG. 4(b) is a waveform diagram of a rectangular wave W2 formed from the IF output signal (IFout2) of FIG. 3(b).
Figure 4:
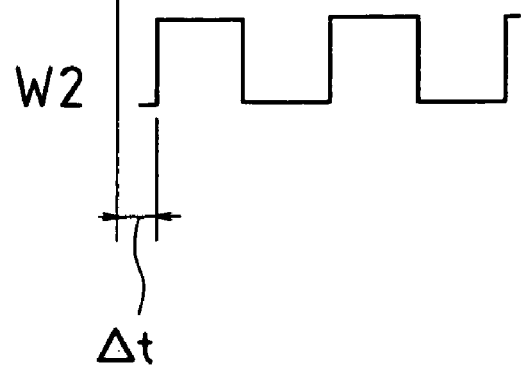

A measuring operation of the relative move distance of the object is as follows. First, if IF signals based on reflected waves of two microwaves with different frequencies are sinusoidal waves IFout1 and IFout2 shown in FIG. 3(a) and FIG. 3(b) (which have a phase difference corresponding to a distance to the detection target object), rectangular waves W1 and W2 formed from these IF signals will be as shown in FIG. 4(a) and FIG. 4(b). By detecting the phase difference between these rectangular waves W1 and W2 (converted from a time difference Δt between rising edge portions of the rectangular waves in the figures), the distance to the detection target object will be measured. By recognizing a temporal change in the phase difference between the rectangular waves W1 and W2, movement of the object in the detection area is recognized and a total move distance of the object is measured.

A characteristic of the present invention resides in a setup technique of "the object decision move distance" for deciding whether the object is the detection target object or not based on the total move distance of the detected object. Hereinafter, the setup technique of the object decision move distance is described.

Figure 2:
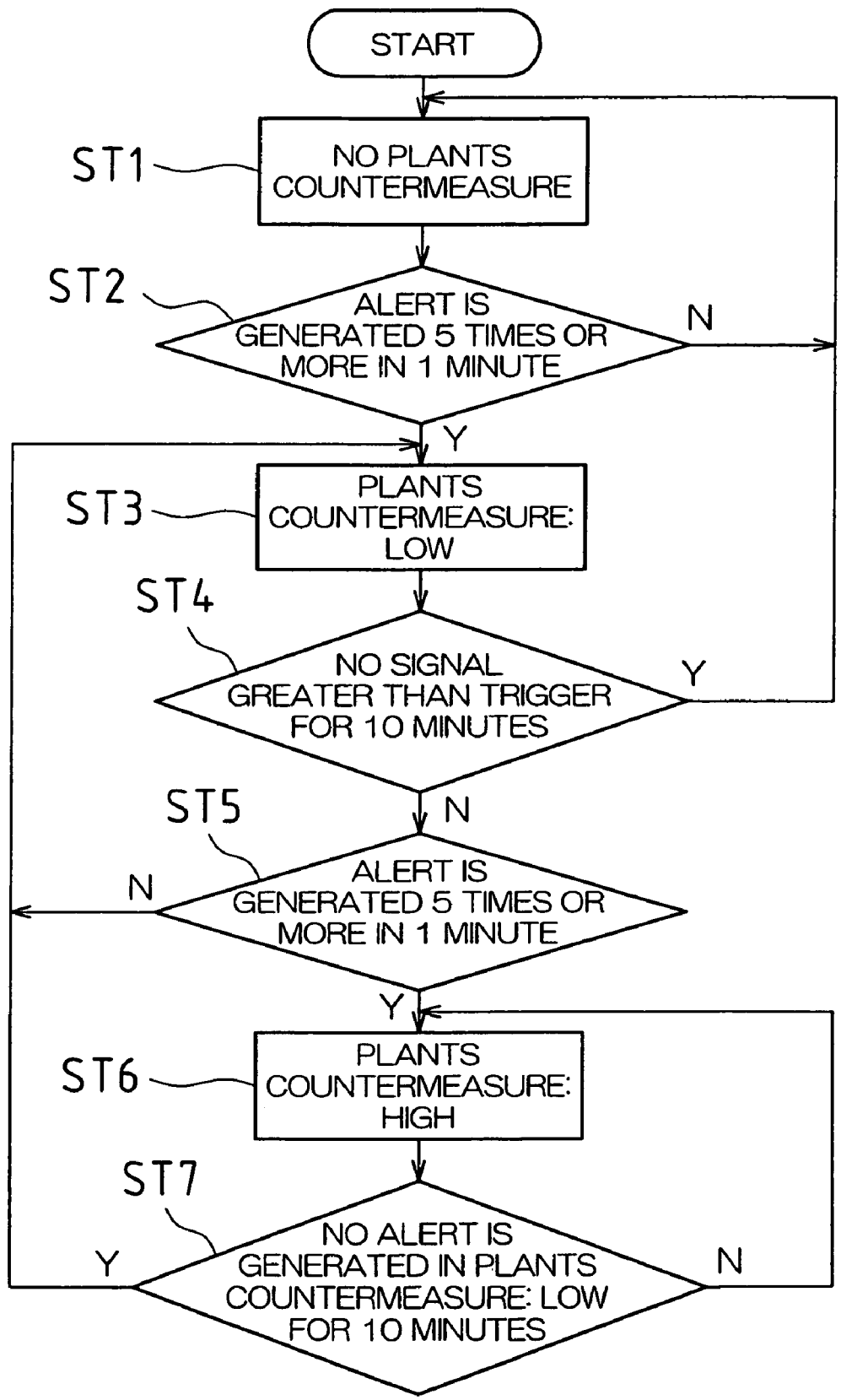
FIG. 2 is a flowchart for describing a switching operation of a plants countermeasure level.

The object decision move distance can be switched between two types (two stages). Specifically, one is 20 centimeters (cm) and the other is 100 cm. Therefore, if the object decision move distance is set to 20 cm, when an object in the detection area moves 20 cm or more, the object is decided to be the detection target object and the microwave sensor 1 generates an alert. On the other hand, if the object decision move distance is set to 100 cm, unless an object in the detection area moves 100 cm or more, the object is not decided to be the detection target object (the microwave sensor 1 does not generate an alert). In other words, the microwave sensor 1 in the present invention can be switched to a status for not conducting the plants countermeasure, a status for conducting the plants countermeasure and setting the object decision move distance to 20 cm, and a status for conducting the plants countermeasure and setting the object decision move distance to 100 cm. These switching operations are described bellow in accordance with a flowchart of FIG. 2.

First, at the time of startup, the microwave sensor 1 is in a status that the plants countermeasure is not conducted (a no plants countermeasure conducted status) (step ST1). In this status, an alert will be generated when a signal level exceeds a trigger level due to the object movement in the detection area. In this status, it is decided whether an alert has been generated 5 times or more in 1 minute or not in step ST2. If this decision is YES, it is decided that alerts (false alerts) are generated frequently by swinging of plants due to effects of winds and that an accurate object detection can not be performed in this situation and, in step ST3, the plants countermeasure is conducted. The plants countermeasure level in this time is "plants countermeasure level: low" where the object decision move distance is set to 20 cm. Therefore, the setting is switched such that, if a move distance of the object in the detection area is less than 20 cm, an alert is not generated, and when the move distance exceeds 20 cm, the object is decided to be the detection target object and an alert is generated by the microwave sensor 1. On the other hand, the decision in step ST2 is NO, it is decided that false alerts due to the swinging of plants or the like are not generated frequently and the no plants countermeasure conducted status is maintained.

In the status that the plants countermeasure level is set to "low", it is decided whether a signal greater than the trigger level is not generated (an alert is not generated) for 10 minutes or not in step ST4, and if this decision is YES, it is decided that a false alert is not likely to be generated by swinging of plants or the like because the wind stops, and the plants countermeasure is canceled by returning to step ST1.

On the other hand, if the decision in step ST4 is NO, by proceeding to step ST5, it is decided whether the alert has been generated 5 times or more in 1 minute. If this decision is YES, the alerts (false alerts) are still generated frequently by swinging of plants or the like due to effects of winds and that an accurate object detection can not be performed in this situation and, in step ST6, the plants countermeasure level is changed. The plants countermeasure level in this time is "plants countermeasure level: high" where the object decision move distance is set to 100 cm. Therefore, the setting is switched such that, if a move distance of the object in the detection area is less than 100 cm, an alert is not generated, and when the move distance exceeds 100 cm, the object is decided to be the detection target object and an alert is generated by the microwave sensor 1. On the other hand, the decision in step ST5 is NO, it is decided that a false alert due to the swinging of plants or the like is not likely to be generated in this situation because the plants countermeasure level is set to "low", and by returning to step ST3, the plants countermeasure level is maintained in the "low" status.

As stated above, in the status that the plants countermeasure level is set to "high", since the object is not decided to be the detection target unless the move distance of the object in the detection area reaches to 100 cm, a false alert of the microwave sensor 1 can be avoided.

In this situation, following decision operation is executed in step ST7. Assuming that the plants countermeasure level is set to "low" in this situation, it is decided whether an alert has not been generated for 10 minutes and, if this decision is YES, it is decided that a false alert will not be likely to be generated in this situation (environment) even if the plants countermeasure level is changed (returned) to "low", and by returning to step ST3, the plants countermeasure level is returned to the "low" status. In this way, the plants countermeasure level is set to prevent a missed alert.

On the other hand, if the decision in step ST7 is NO, by returning to step ST6, the plants countermeasure level is maintained in the "high" status.

By repeating above operations, the object detection operation is conducted in the detection area while the appropriate object decision move distance is set depending on environmental changes (such as changes in the wind).

As stated above, in this embodiment, by enabling the object decision move distance as a decision value for determining the plants countermeasure level to be changed, the setting is changed depending on environmental changes, such that the plants countermeasure level is increased in the situation that false alerts are generated frequently, whereas, in the situation that a false alert is not likely to be generated, the plants countermeasure level is decreased corresponding to the situation in order to lessen the missed alerts. Therefore, the object decision move distance can be automatically set such that a false alert and a missed alert are not likely to be generated, depending on the swinging of plants due to effects of winds and vibration of the sensor itself, so that the object detection accuracy of the microwave sensor 1 can be intended to be improved.

Other Embodiments

In the embodiment stated above, description has been made for the microwave sensor 1 for measuring a distance to an object utilizing two microwaves with different frequencies. The present invention is not limited to this and can be applied to a microwave sensor measuring a distance to an object utilizing three or more microwaves with different frequencies or a microwave sensor measuring a distance to an object in the stereo scheme or other schemes. Also, the present invention can be applied to a microwave sensor used in combination with a passive infra-red (PIR) sensor.

Also, in above embodiment, an object decision movement distance can be switched between the case of 20 cm and the case of 100 cm as a plants countermeasure. The present invention is not limited to this, and the object decision movement distance can be switched among three or more stages. Also, values of the object decision movement distance are not limited to above values.

Further, in the above embodiment, a non-detection target object is described taking plants as an example. The present invention is not limited to this and, in the situation that a blind or curtain is swinging due to wind and in the situation that an exhaust fan is rotating, these can be recognized as the non-detection target objects.

Additionally, according to the present invention, even in the situation that the microwave sensor 1 itself is vibrating due to wind, earthquakes or passage of a heavy vehicle resulting in movement of location relative to the object in the detection area, a good decision can be made for whether the detected object is a human body (an intruder) which is the detection target object or plants or the like which is the non-detection target object.

Further, the microwave sensor 1 of the present invention can be applied to applications other than the security sensor.

The present invention could be implemented in various other manners without departing from the spirit and major features thereof. Therefore, the above embodiments are mere exemplifications in all respects and should not be construed as limitation. The scope of the present invention is delimited by the appended claims and by no means restricted by the texts of this specification. Further, all modifications and alterations belonging to an equivalent range of the claims are within the scope of the present invention.

What is claimed is:

1. A microwave sensor operable to transmit microwaves toward a detection area and operable to detect whether an object is located within the detection area, wherein if an object is located within the detection area said microwave sensor is operable to receive the microwaves reflected and modulated by a Doppler effect from the object located within the detection area, said microwave sensor comprising:

an object decision unit operable to receive the reflected microwaves, operable to measure a move distance of the object located within the detection area, and operable to determine that the object located within the decection area is a detection target object only if the measured move distance is greater than a preset object decision move distance, wherein said object decision unit is operable to change the object decision move distance to a longer distance when the number of times that said object decision unit determines that the object is the detection target object within a first predetermined period of time preset in advance is equal to or greater than a first predetermined number of times, and said object decision unit is operable to subsequently change the object decision move distance to a shorter distance when the number of times that said object decision unit determines that the object is the detection target object within a second predetermined period of time preset in advance is less than a second predetermined number of times.

2. The microwave sensor according to claim 1, wherein the object decision move distance is changeable among a plurality of levels, and said object decision unit is operable to change the object decision move distance by one level both when the object decision move distance is decided by said object decision unit to be a longer distance and when the object decision move distance is decided by said object decision unit to be a shorter distance.

3. The microwave sensor according to claim 1, wherein the object decision move distance is changeable among a plurality of levels, and if after the object decision move distance has been changed to a longer distance, the number of times that said object decision unit determines that the object is the detection target object within the second predetermined period of time is less than the second predetermined number of times, the object decision unit is operable to change the object decision move distance to a shorter distance, and if after the object decision move distance has been changed to be a longer distance, the number of times that said object decision unit determines that the object is the detection target object within the second predetermined period of time is equal to or greater than the second predetermined number of times, the object decision unit is operable to maintain the currently set object decision move distance.

4. The microwave sensor according to claim 2, wherein the object decision move distance is changeable among a plurality of levels, and if after the object decision move distance has been changed to a longer distance, the number of times that said object decision unit determines that the object is the detection target object within the second predetermined period of time is less than the second predetermined number of times, the object decision unit is operable to change the object decision move distance to a shorter distance, and if after the object decision move distance has been changed to be a longer distance, the number of times that said object decision unit determines that the object is the detection target object within the second predetermined period of time is equal to or greater than the second predetermined number of times, the object decision unit is operable to maintain the currently set object decision move distance.

* * * * *